US010783153B2

(12) United States Patent
Natal et al.

(10) Patent No.: US 10,783,153 B2
(45) Date of Patent: Sep. 22, 2020

(54) EFFICIENT INTERNET PROTOCOL PREFIX MATCH SUPPORT ON NO-SQL AND/OR NON-RELATIONAL DATABASES

(71) Applicant: Cisco Technology, Inc., San Jose, CA (US)

(72) Inventors: Alberto Rodriguez Natal, Mountain View, CA (US); Vina Ermagan, San Francisco, CA (US); Fabio Maino, Palo Alto, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 476 days.

(21) Appl. No.: 15/661,109

(22) Filed: Jul. 27, 2017

(65) Prior Publication Data

US 2019/0005045 A1    Jan. 3, 2019

Related U.S. Application Data

(60) Provisional application No. 62/527,324, filed on Jun. 30, 2017.

(51) Int. Cl.
| | |
|---|---|
| *G06F 16/24* | (2019.01) |
| *G06F 16/2457* | (2019.01) |
| *H04L 12/745* | (2013.01) |
| *G06F 16/22* | (2019.01) |
| *G06F 16/903* | (2019.01) |

(52) U.S. Cl.
CPC .... *G06F 16/24578* (2019.01); *G06F 16/2282* (2019.01); *G06F 16/90344* (2019.01); *H04L 45/748* (2013.01)

(58) Field of Classification Search
CPC ........... G06F 16/24578; G06F 16/2282; G06F 16/90344; H04L 45/748
See application file for complete search history.

(56) References Cited

U.S. PATENT DOCUMENTS

| | | | |
|---|---|---|---|
| 6,725,326 B1 | 4/2004 | Patra et al. | |
| 7,111,071 B1* | 9/2006 | Hooper | H04L 45/00 |
| | | | 370/395.32 |
| 8,447,754 B2 | 5/2013 | Weissman et al. | |
| 9,183,322 B2* | 11/2015 | Kapadia | H04L 45/74 |
| 9,201,982 B2* | 12/2015 | Lin | G06F 16/9027 |
| 2004/0236720 A1* | 11/2004 | Basso | H04L 45/00 |
| 2008/0056262 A1* | 3/2008 | Singh | H04L 45/7457 |
| | | | 370/392 |
| 2010/0058027 A1* | 3/2010 | Gong | G06F 16/325 |
| | | | 711/216 |
| 2011/0179013 A1 | 7/2011 | Jiang et al. | |
| 2012/0063189 A1* | 3/2012 | Maurya | H04L 45/748 |
| | | | 365/49.17 |

(Continued)

FOREIGN PATENT DOCUMENTS

WO    2017093576 A1    6/2017

*Primary Examiner* — Huawen A Peng
(74) *Attorney, Agent, or Firm* — POLSINELLI PC

(57) ABSTRACT

Systems and methods for automatically executing an efficient longest internet protocol prefix match on non-relational and/or No-SQL databases, such as Cassandra. Clustering prefixes around common and/or standard prefix lengths ensures efficient use of Cassandra's underlying mechanisms and minimizes costly scan operations.

18 Claims, 5 Drawing Sheets

(56) References Cited

U.S. PATENT DOCUMENTS

| | | | |
|---|---|---|---|
| 2013/0246651 A1* | 9/2013 | Keen | H04L 45/748 |
| | | | 709/238 |
| 2014/0086249 A1* | 3/2014 | Assarpour | H04L 45/7457 |
| | | | 370/392 |
| 2014/0122791 A1* | 5/2014 | Fingerhut | G11C 15/00 |
| | | | 711/108 |
| 2014/0219279 A1* | 8/2014 | Gross | H04L 5/005 |
| | | | 370/392 |
| 2016/0026712 A1 | 1/2016 | Edwards et al. | |
| 2017/0237691 A1* | 8/2017 | Suresh | H04L 45/745 |
| | | | 370/392 |
| 2017/0366459 A1* | 12/2017 | Kfir | H04L 45/748 |
| 2017/0366502 A1* | 12/2017 | Kravchik | H04L 67/2842 |

\* cited by examiner

EFFICIENT INTERNET PROTOCOL PREFIX MATCH SUPPORT ON NO-SQL AND/OR NON-RELATIONAL DATABASES

CROSS REFERENCE TO RELATED APPLICATIONS

The present non-provisional utility application claims priority under 35 U.S.C. § 119(e) to provisional application No. 62/527,324 entitled "Efficient Internet Protocol Prefix Match Support On No-SQL And/Or Non-Relational Databases" filed on Jun. 30, 2017, and which is hereby incorporated by reference herein.

TECHNICAL FIELD

Aspects of the present disclosure relate to Internet Protocol ("IP") networking and IP prefix matching, and in particular, to executing queries in a non-relational and/or non-standard query language ("No-SQL") database to identify a longest IP prefix match.

BACKGROUND

A longest IP prefix match is a specific type of operation or query used in IP networking environments to identify a routing entry that has the longest common IP prefix with a destination IP address. Traditionally, IP longest prefix match lookups have been enabled using Radix tree data structures to process and store the prefixes.

However, the use of longest IP prefix match queries and Radix data structures within non-relational and/or No-SQL databases may present challenges. For example, using a Radix tree data structure within a non-relational and/or No-SQL database typically requires the execution of multiple sequential database queries, which adds latency to the longest IP prefix match operation. Moreover, typical non-relational and/or No-SQL databases lack mechanisms to execute a longest IP prefix match query efficiently, which ultimately limits the use of non-relational and/or No-SQL databases in certain network environment deployments.

BRIEF DESCRIPTION OF THE FIGURES

The foregoing and other objects, features, and advantages of the present disclosure set forth herein will be apparent from the following description of particular embodiments of those inventive concepts, as illustrated in the accompanying drawings. Also, in the drawings the like reference characters refer to the same parts throughout the different views. The drawings depict only typical embodiments of the present disclosure and, therefore, are not to be considered limiting in scope.

DESCRIPTION OF EXAMPLE EMBODIMENTS

Figure 1:
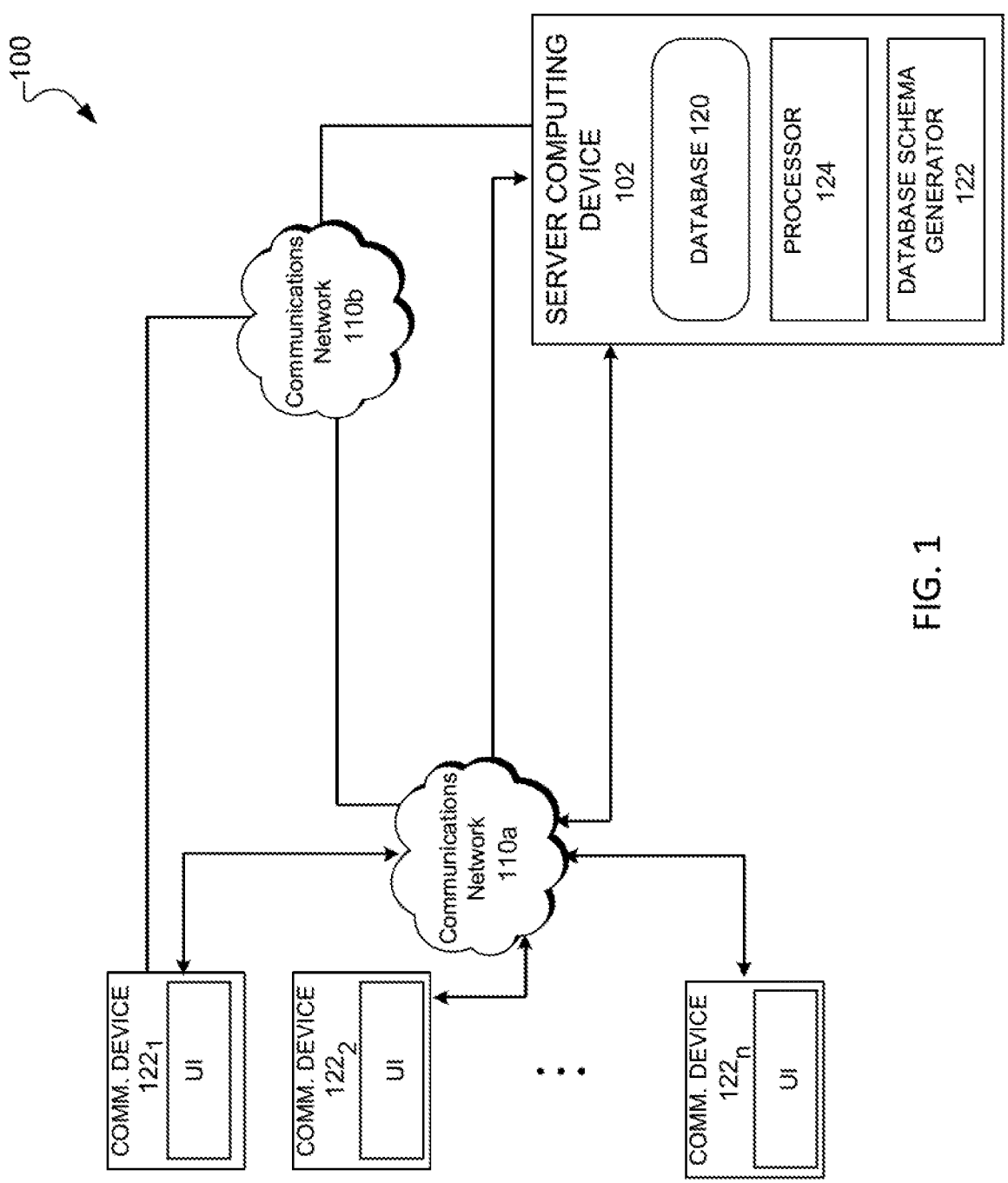
FIG. 1 is a block diagram illustrating a computing environment for executing longest IP prefetch match queries in No-SQL and/or non-relational databases, according to various aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed herein are systems, methods, and computer-readable media for IP Prefix matching. The systems, methods, and computer-readable media include defining a plurality of tables in a non-relational database, each table of the plurality of tables indexed based on a first portion of an internet protocol prefix, a second portion of the internet protocol prefix, and a mask length associated with the internet protocol prefix, and wherein query results from the non-relational database are returned according to a descending order based on the second portion of the internet protocol prefix and the mask length associated with the internet protocol prefix. The systems, methods, and computer-readable media include executing in parallel, a query, for a longest prefix match of an internet protocol address, at each table of the plurality of tables, thereby causing a lookup for the longest prefix match of the internet protocol address across the non-relational database, wherein the descending order ensures that a result from the query will correspond to a most specific prefix associated with the internet protocol address. The systems, methods, and computer-readable media include based on the executing in parallel, obtaining a set of query results and identifying a specific result from the set of query results.

Description

Aspects of the present involve systems, methods, and computer readable-mediums that enable the efficient execution of IP networking "longest prefix match" queries in non-relational and/or No-SQL databases, such as for example a Cassandra-like (i.e., column based key-valued) No-SQL database. Generally speaking, the longest IP prefix match refers to an algorithm used in IP networking to select a specific entry from a table, such as a forwarding table of a router that corresponds to a queried destination IP address. The most specific of the matching table entries—the one with the longest subnet mask—is called the longest prefix match, as it is also the entry where the largest number of leading address bits of the destination address (i.e., the searched IP address) match those in the table entry. Thus, a query for the longest prefix match returns (if such entry exists) the prefix that both matches the prefix of the destination IP address and is determined to be the longest prefix out of all the prefixes in the table.

To enable a longest prefix match search, a database schema is generated and/or otherwise obtained by the system that enables the system to generate a plurality of tables within in the database that are indexed based on a portion of an IP prefix or prefixes. Additionally, the entries of the tables are ordered according to a descending order (the resultant set of data records are sorted in a descending order based on the value of the remaining portion of the IP prefixes) to handle overlapping IP prefixes and/or gaps in the IP prefixes. Based on the generated tables, the system may automatically execute one or more longest IP prefix match operations to identify the longest prefix for a queried internet protocol address. During execution of the query, all of the generated tables of the database may be queried in parallel. For each table, the query may return a result identifying a potential IP prefix match, resulting in a set of results being obtained. The system selects the most specific IP prefix from the set of results as the longest prefix match.

The present application and various examples described herein will refer to the Cassandra non-relational and/or no-SQL database, but the disclosure is not so limited. Rather, it is contemplated that various aspects of the present disclosure can be applied to other key-value, column-based (or wide column) No-SQL databases, such as BigTable. HBase or ScyllaDB, among others.

FIG. 1 illustrates an example computing environment 100 for automatically executing longest IP prefetch match queries in No-SQL and/or Cassandra-like databases, according to one embodiment. As illustrated. FIG. 1 include various computing devices communicating through one or more networks 110a. 100b. The one or more networks may be an IP-based telecommunications network, the Internet, an intranet, a local area network, a wireless local network, a content distribution network, or any other type of communications network, as well as combinations of networks. For example, in one particular embodiment, the network 100 may be a telecommunications network including fiber-optic paths between various network elements, such as servers, switches, routers, and/or other optical telecommunications network devices that interconnect to enable receiving and transmitting of information between the various elements as well as users of the network.

In particular, the computing environment 100 includes a server computing device 102 that is in communication with communication devices ($122_1$, $122_2$, ..., $122_n$) located at one or more geographic locations. The communication devices ($122_1$, $122_2$, ..., $122_n$) may be any of, or any combination of, a personal computer; handheld computer; mobile phone; digital assistant; smart phone; server; application; and the like. In one embodiment, each of the communication devices ($122_1$, $122_2$, ..., $122_n$) may include a processor-based platform that operates on any suitable operating system, such as Microsoft® Windows®, Linux®, and/or the like that is capable of executing software.

The server computing device 102, may be a processing device that functionally connects or otherwise communicates (e.g., using the one or more networks 110a, 100b) with the communication devices ($122_1$, $122_2$, ..., $122_n$) included within the computing environment 100. A user interested in executing a query and/or command to identify the longest IP prefix match for a given IP address may interact with one of the communication devices ($122_1$, $122_2$, ..., $122_n$) to initiate a request, which may be received by the server computing device 102. More particularly, the communication devices ($122_1$, $122_2$, ..., $122_n$) may also include a user-interface, such as a browser application (i.e., a graphical-user interface) or a command-line interface (i.e., a text interface) and/or the like, to generate a query for identifying the longest IP prefetch match in a No-SQL and/or non-relational database. In response, the server computing device 102 may transmit instructions that may be processed and/or executed to generate, or otherwise display, a UI for receiving a query and/or command to identify the longest IP prefix match.

The processing device 102 includes a database 120, a database schema generator 122, and a processor 124. The database 120 may be a database, data store, storage and/or the like, implemented using No-SQL and/or non-relational mechanisms for data storage and retrieval. Stated differently, the database 120 is a database that provides a mechanism to store and retrieve data using mechanisms other than the tabular relations used in relational databases. In particular, the database is a No-SQL key-value column-based database. In one specific example, the database 120 may a Cassandra database, which is a highly scalable, high-performance distributed database designed to handle large amounts of data across many commodity servers, providing high availability with no single point of failure. Alternatively, the database 120 may be other common No-SQL databases such as: BigTable, HBase, ScyllaDB, etc.

The database schema generator 122 generates a database schema for the database 120. Generally speaking, a database schema is a blueprint that represents the logical configuration of all or part of a database. A database schema can exist as both a visual representation and/or as a set of procedures that govern the database. The procedures are expressed in a data definition language, such as No-SQL for general non-relational databases. Referring to a Cassandra database, the Cassandra Query Language ("CQL") for Cassandra non-relational databases may be used. The database schema indicates how the entities—including tables, views, stored procedures, etc.—that make up the database relate to one another, and more.

The processor 124 executes queries and retrieves data requested in the queries from the database 120. In some embodiments, the processor 124 may execute queries against multiple tables of the database 120 in parallel. In particular, the processor 124 executes multiple queries in parallel at different nodes of the database 120 (e.g., nodes of a cluster in a Cassandra database). The execution time of a single query in a single node is similar for all nodes, but several queries may be executed at the same time. The more nodes, the faster the query per node (since less data is in each node). Stated differently, the more nodes, the more distributed the prefixes can be across the nodes and thus the less prefixes have to be scanned in each node. By dividing the work necessary to run a statement among multiple processes, the processor 124 can run the query more quickly than if only a single process is used. The processor 124 may be any type of processing unit capable of executing database queries in parallel.

Figure 2:
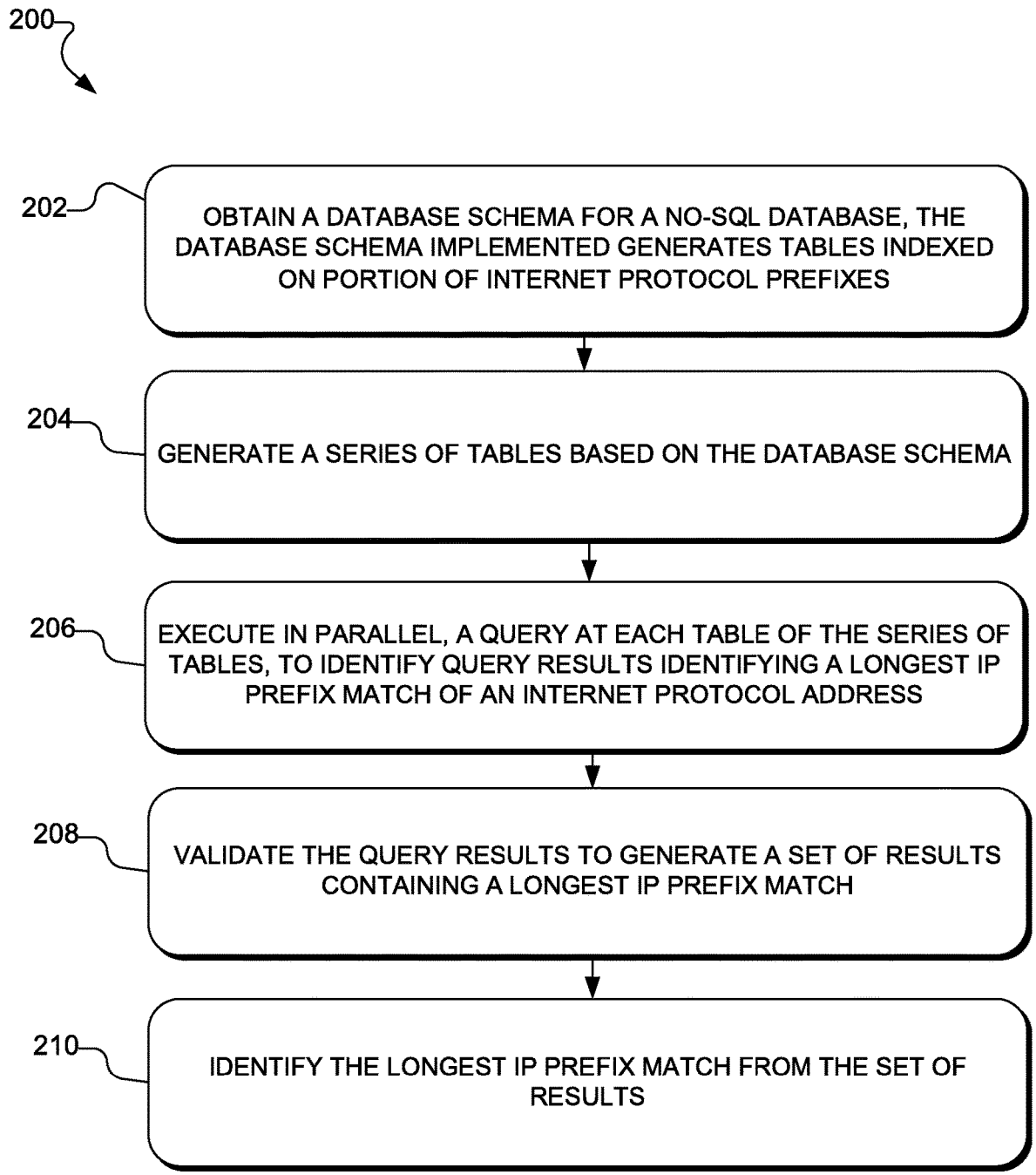
FIG. 2 is a flowchart illustrating an example process and/or method for executing longest IP prefetch match queries in No-SQL and/or non-relational databases, according to aspects of the present disclosure.

Referring now to FIG. 2 and with reference to FIG. 1, an illustrative process 200 for executing queries to identify longest IP prefix matches for a given internet protocol address in a non-relational and/or No-SQL database is provided. The method will be explained referring to the non-relational and/or No-SQL database Cassandra. It is contemplated, however, that the process may involve other non-relational and/or No-SQL databases.

As illustrated, process 200 begins at 202, with obtaining a database schema for the Cassandra database. In one embodiment, the obtained database schema may be defined based on prefixes of internet protocols (referred to herein as "IP prefixes"). In particular, the database schema may be designed so that any tables generated from the database schema are indexed based on portions of an IP prefix. More specifically, the database schema may be defined so that a first portion of the IP prefix is used as an index for a given partition of the Cassandra database, and a second portion of the prefix (including the prefix mask) is used to define the internal order within the partition as descending.

In a Cassandra database, a table can have a number of partitions. A partition represents a set of rows (i.e., two or more rows in the table). Thus, each table has a number of rows included within a partition. Each row is referenced by a "compound primary key", also called the row key. There are a number of columns in a row but the number of columns can vary in different rows. For example, one row in a table can have three columns whereas another row in the same table can have 10 columns.

A compound primary key is comprised of one or more columns that are referenced in the primary key. One component of the compound primary key is called "partition key", whereas the other component is called the clustering key. A partition key is the primary lookup to find a specific set of rows (i.e. a partition). A clustering key controls how the rows are ordered in a partition. The following are different variations of primary keys, where C1, C2, C3, ... and so on represent columns in the table:
  C1: Primary key has only one partition key and no cluster key.
  (C1, C2): Column C1 is a partition key and column C2 is a cluster key.
  (C1, C2, C3, ... ): Column C1 is a partition key and columns C2, C3, and so on make the cluster key.
When the compound key is C1, C2, C3, then the first key, C1, becomes the partition key, and the rest of the keys become part of the cluster key.

As noted above, the purpose of the partition key is to identify the partition or node in a cluster that stores a particular row, as all rows sharing the same partition key are stored on the same physical node. In particular, when data is read or written from the cluster, a function called "Partitioner" is used to compute the hash value of the partition key. The generated hash value is used to determine the node/partition which contains that row. For example, rows whose partition key values range from 1000 to 1234 may reside in node A, and rows with partition key values range from 1235 to 2000 may reside in node B. In such an example, if a row contains partition key whose hash value is 1233 then it will be stored in node A.

As noted above, the purpose of the clustering key is to controls how the rows are ordered in a partition. The sorting of data is based on columns, which are included in the clustering key. Using a descending order for the second portion or last portion of the prefix (i.e., sub prefixes) and masks on table creation forces more specific prefixes to be checked before less specific. Thus, a descending order ensures that a hit will always be for the most specific possible prefix for a given input address (i.e. 1.1.1.0/24 would be checked before than 1.1.0.0/16).

Referring again to FIG. 2, at 204, the database schema is used to generate a series of tables within the Cassandra database. In particular, a command may be executed that generates tables in accordance with the generated database schema. For example, assuming the obtained database schema was defined for a Cassandra database, the following command could be executed to generate one or more tables based on the database schema: CREATE TABLE ipv4slash 16 (firstpart int, lastpart int, mask int, address text, PRIMARY KEY (first part, last part, mask)) WITH CLUSTERING ORDER BY (last part DESC, mask DESC). The database schema may be created/defined once during database creation and initialization, before any lookup processes are executed.

The number of tables generated may be based on prefix lengths. For example, a different table may be generated per each possible prefix length. In another example, the system may split the prefixes into chunks of equal length size, e.g., split IPv4 space in half (/0, /16). In yet another example, a table may be generated per each possible mask length. e.g. 128 tables for IPv6. However both ends (few tables or a lot of tables) are not ideal, since they do not reflect the real distribution of IP addresses.

Figure 3A:
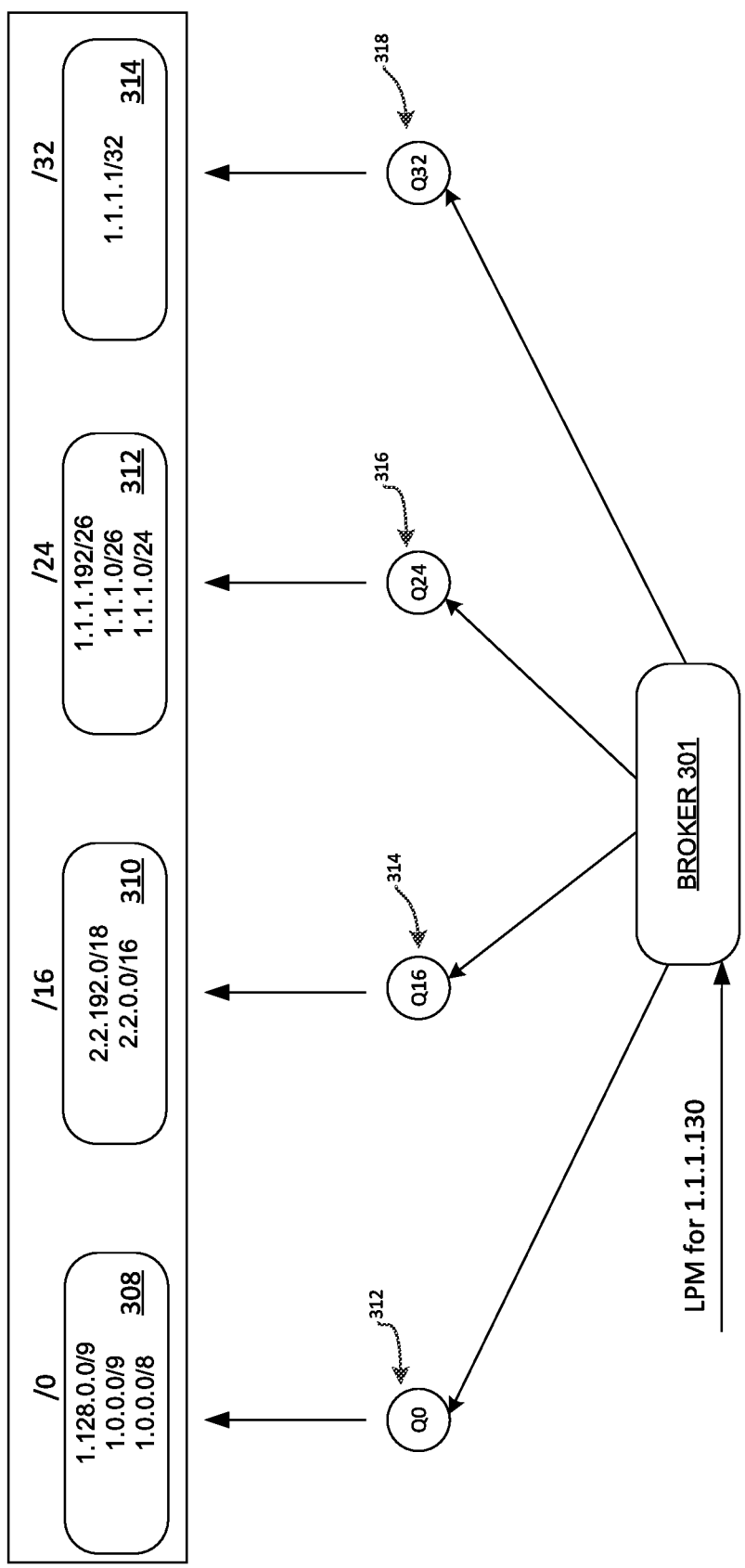
FIG. 3A-3B are examples of database tables, according to aspects of the present disclosure.

In one specific example, the number of generated tables should large enough to ensure an efficient exact-match process. To do so, the number of tables generated should reflect the real distribution of mask lengths. For instance for a prefix distribution similar to the Internet the system may generate the following tables: For IPv4: /0, /16, /22, /24, /32. For IPv6: /0, /19, /29, /32, /36, /40, /44, /48, /64, /128. Such numbers roughly reflect the distribution of prefix lengths on the public Internet and serve as an estimator for the prefix length distribution. In some embodiments, special tables, covering large general policies (i.e. /0) and mobility use-cases (i.e. /32 and /128) are included to complement the data from Internet prefixes. FIG. 3A provides an illustration of a series of tables that may be generated. As illustrated, there are four different tables generated within the database, i.e. table "/0" 302, "/16" 304, "/24" 306, and "/32" 308. Thus, the system clusters prefixes around common and/or standard prefix lengths to ensure efficient use of Cassandra's underlying mechanisms and minimizes costly scan operation.

Referring again to FIG. 2, at 206, one or more IP queries attempting to identify the "Longest Prefix Match" of a given IP address may be executed at the generated tables of the database and query results may be received. In one embodiment, the queries may be executed in parallel to improve the overall global lookup time required to identify the match. Due to the arrangement of the generated tables, the Cassandra database is able to query the tables using the "firstpart" as an exact match and the "lastpart" for a scan search. For example, to query for 192.168.50.44 in a table that stores prefixes split via /16, the command may include: SELECT*FROM ipv4slash16 WHERE firstpart=49320 AND lastpart>=12844 limit 2. The result of executing the command is two consecutive rows from the table, which may be used to determine whether the returned results are valid, as will be described in detail below.

Referring again to FIG. 2, at 208, the received query results may be validated. A positive result, or a hit from execution of the query at the Cassandra database does not ensure a successful longest prefix match. Rather, there are possible scenarios where finding a hit in the one table does not ensure an existing suitable prefix for the searched IP address. For example, one is the presence of 'gaps' in the IP space (i.e. an IP address may not find a suitable prefix that covers it on a given table). In such an embodiment, a mask check may be used to ensure that the retrieved prefix is suitable for the input IP address. In particular, each querier must analyze the reply it got for its particular table (if any) to find if it is a positive hit for the particular requested IP address. In order to do that, the original IP address must be checked against the prefix+mask returned in the query to see if the IP address is actually covered by the prefix or not.

Alternatively, query results including prefixes with same address but different mask may be received. For example, overlapping prefixes that share the same prefix address but differ in the mask length (e.g. 1.1.0.0/16 and 1.1.0.0/24) may be received. Results in such a scenario are validated or otherwise addressed by using limit >1, so contiguous rows on the table can be retrieved besides the first available hit. If the first encountered entry is not suitable due to its mask, the next one can be checked to see if it is a less specific mask for the same prefix. For instance a query for 1.1.1.1 may return 1.1.0.0/24 and 1.1.0.0/16, the first result is not valid for the input address, but the second one is. A limit of at least 2 is recommended to support one-level of overlapping, which is a common case in many deployments. If the entries returned by the database for the table are all checked and none is a suitable one, a second query with a higher limit should be executed to return the rest. The first valid entry (i.e., the first suitable entry that passes the validity checks) is returned by the querier to the broker, if such entry exists.

At 210, the output of set of results are analyzed to determine the most specific longest prefix match of the searched IP address. To do so, each of the results in the set of results are analyzed in order, starting with the most specific result. As soon as there is a hit on a table, there is no need to check any other results returned from any other less specific tables. For example, for the case of IPv4, if there was a successful hit on prefix with mask /32, there is no need to check any other less specific hits, enabling results to be delivered faster.

Figure 3B:
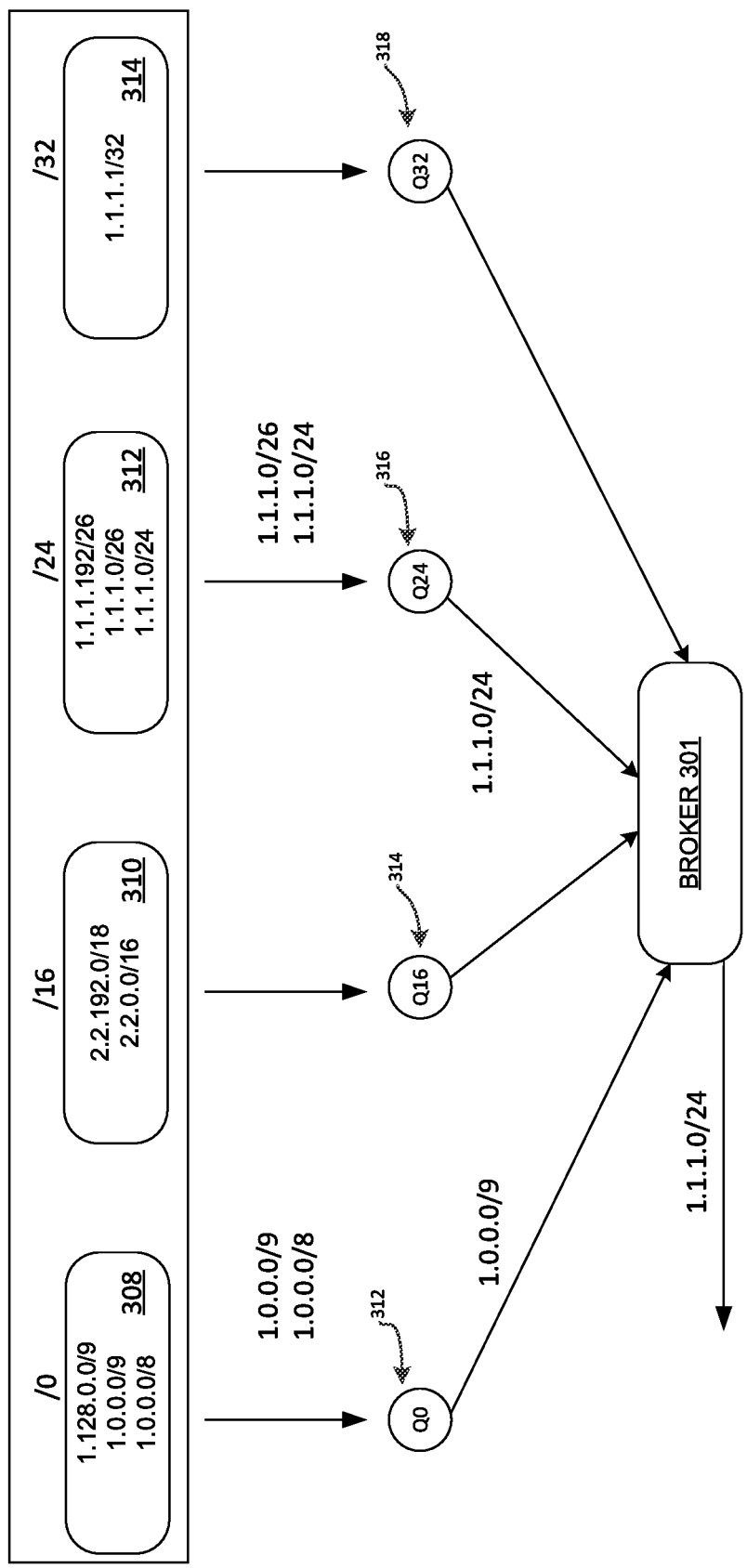

FIGS. 3A-3B illustrate an example of a Longest Prefix match for the address 1.1.1.130. In the illustrated embodiment of FIG. 3A, there are four different tables, "/0" 302, "/16" 304, "/24" 306, and "/32" 308, in the database. A broker 301 (e.g., a process or instruction executed by the processor 124) replicates and disseminates the request across the different queriers 310, 312, 314, and 316 (also an instruction or process) which in turn query one of the tables "/0" 302, "/16" 304, "/24" 306, and "/32" 308. For this example we assume that the limit for the number of entries returned per query is 2 (i.e. at most two entries will be returned per table by the database).

In FIG. 3B, the responses come back to the queriers 310, 312, 314, and 316. For tables "/0" 302 and "/32" 308, there was no hit, but in tables "/16" 304, "/24" 306 there were two hits in each. The role of the querier (e.g., querier 310, 312, 314, and 316) is then to discriminate based on the mask. In the case of Q0 310, the first result passes the mask check so it is returned to the broker 301. In the case of Q24 312, the first entry retrieved (1.1.1.0/26) does not pass the mask check (i.e. 1.1.1.0/26 does not cover the requested IP 1.1.1.130), but the second one does pass and it is the one returned to the broker 301 (note that if the second one had not passed, another query with higher limit would have been needed). As soon as the broker gets the negative response from Q32 316 and the positive response from Q24 314, it is able to reply with the result from Q24 314. It does not need to wait for any other querier to return its results.

Figure 4:
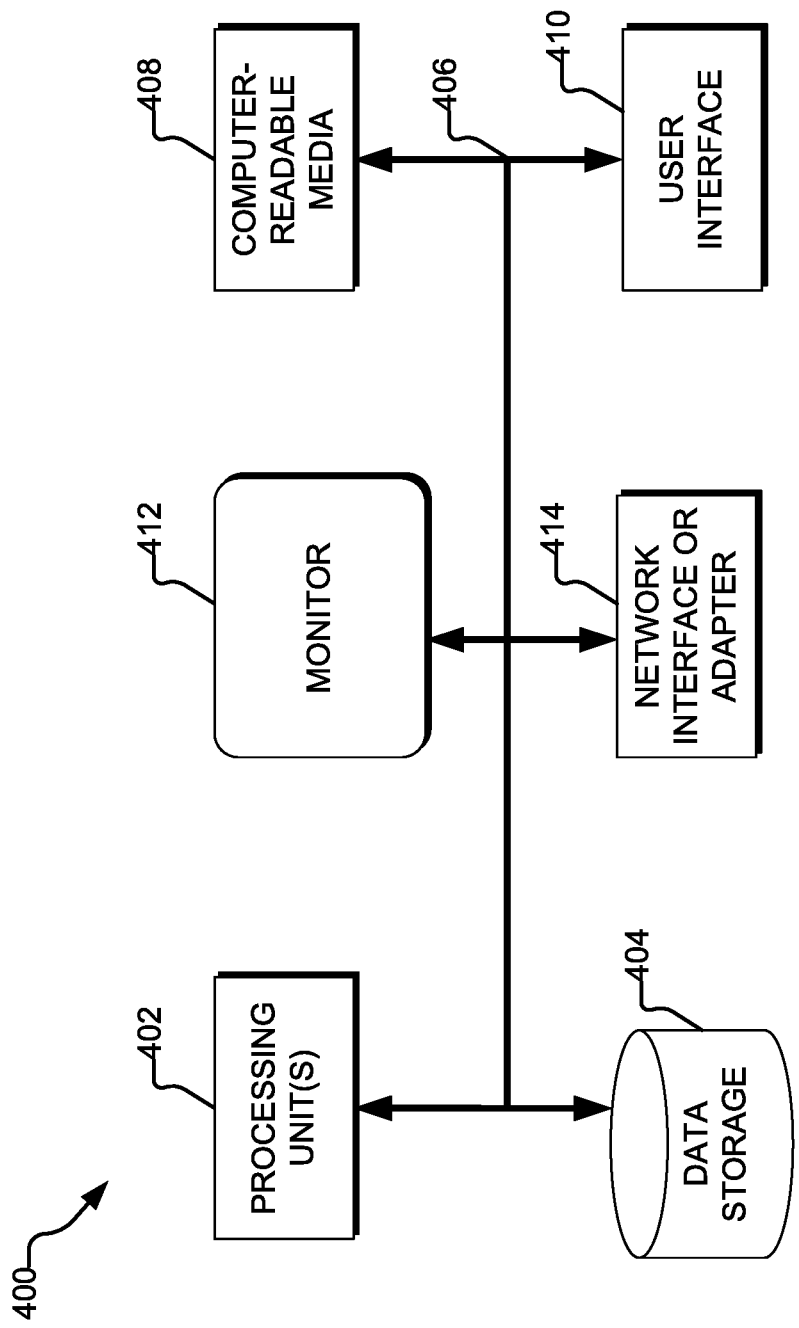
FIG. 4 is an example computing device specifically configured and implemented for executing longest IP prefetch matches in No-SQL and/or non-relational databases, according to aspects of the present disclosure.

FIG. 4 illustrates an example of a suitable computing and networking environment 400 that may be used to implement various aspects of the present disclosure described in FIG. 1-2. As illustrated, the computing and networking environment 400 includes a general purpose computing device 400, although it is contemplated that the networking environment 400 may include one or more other computing systems, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments that include any of the above computing systems or devices, and the like.

Components of the computer 400 may include various hardware components, such as a processing unit 402, a data storage 404 (e.g., a system memory), and a system bus 406 that couples various system components of the computer 400 to the processing unit 402. The system bus 406 may be any of several types of bus structures including a memory bus or memory controller, a peripheral bus, and a local bus using any of a variety of bus architectures. For example, such architectures may include Industry Standard Architecture (ISA) bus. Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 400 may further include a variety of computer-readable media 408 that includes removable/non-removable media and volatile/nonvovlatile media, but excludes transitory propagated signals. Computer-readable media 408 may also include computer storage media and communication media. Computer storage media includes removable/non-removable media and volatile/nonvolatile media implemented in any method or technology for storage of information, such as computer-readable instructions, data structures, program modules or other data, such as RAM, ROM. EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the computer 400. Communication media includes computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic. RF, infrared, and/or other wireless media, or some combination thereof. Computer-readable media may be embodied as a computer program product, such as software stored on computer storage media.

The data storage or system memory 404 includes computer storage media in the form of volatile/nonvolatile memory such as read only memory (ROM) and random access memory (RAM). A basic input/output system (BIOS), containing the basic routines that help to transfer information between elements within the computer 400 (e.g., during start-up) is typically stored in ROM. RAM typically contains data and/or program modules that are immediately accessible to and/or presently being operated on by processing unit 402. For example, in one embodiment, data storage 404 holds an operating system, application programs, and other program modules and program data.

Data storage 404 may also include other removable/non-removable, volatile/nonvolatile computer storage media. For example, data storage 404 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media, described above and illustrated in FIG. 4, provide storage of computer-readable instructions, data structures, program modules and other data for the computer 400.

A user may enter commands and information through a user interface 410 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs (e.g., via hands or fingers), or other natural user interfaces may also be used with the appropriate input devices, such as a microphone, camera, tablet, touch pad, glove, or other sensor. These and other input devices are often connected to the processing unit 402 through a user interface 410 that is coupled to the system bus 406, but may be connected by other interface and bus structures, such as a parallel port, game port or a universal serial bus (USB). A monitor 412 or other type of display device is also connected to the system bus 406 via an interface, such as a video interface. The monitor 412 may also be integrated with a touch-screen panel or the like.

The computer 400 may operate in a networked or cloud-computing environment using logical connections of a network interface or adapter 414 to one or more remote devices, such as a remote computer. The remote computer may be a personal computer, a server, a router, a network PC, a peer device or other common network node, and typically includes many or all of the elements described above relative to the computer 400. The logical connections depicted in FIG. 4 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 400 may be connected to a public and/or private network through the network interface or adapter 414. In such embodiments, a modem or other means for establishing communications over the network is connected to the system bus 406 via the network interface or adapter 414 or other appropriate mechanism. A wireless networking component including an interface and antenna may be coupled through a suitable device such as an access point or peer computer to a network. In a networked environment, program modules depicted relative to the computer 400, or portions thereof, may be stored in the remote memory storage device.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the disclosure and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a portable device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
   defining, using a computing device, a plurality of tables in a non-relational database, each table of the plurality of tables storing one or more internet protocol prefixes and indexed based on a first portion of an internet protocol prefix, a second portion of the internet protocol prefix, and a mask length associated with the internet protocol prefix, and wherein query results from the plurality of tables in the non-relational database are returned according to a descending order based on the second portion of the internet protocol prefix and the mask length associated with the internet protocol prefix;
   executing in parallel, using the computing device, a query, for a longest prefix match of an internet protocol address, at each table of the plurality of tables, thereby causing a lookup for the longest prefix match of the internet protocol address across the non-relational database, wherein the descending order ensures that a result from the query will correspond to a most specific prefix among the internet protocol prefixes stored in the plurality of tables;
   based on the executing in parallel, obtaining, using the computing device, a set of one or more query results from each of at least two of the plurality of tables; and
   identifying, using the at least one computing device, a specific result from the set of one or more query results, the specific result comprising the most specific longest prefix match of the queried internet protocol address among the set of one or more query results.

2. The method of claim 1, wherein the specific result includes a potential internet protocol prefix match returned from the query executed for at least one of the tables of the plurality of tables.

3. The method of claim 1, wherein the specific result comprises a prefix and a mask, the method further comprising validating the specific result by comparing the internet protocol address to the prefix and mask.

4. The method of claim 3, wherein the specific result is identified and returned, before other results of the set of query results are analyzed, if the prefix is more specific than any other prefix yet to be analyzed.

5. The method of claim 1, wherein the plurality of tables are generated based on a distribution of prefixes across a plurality of mask lengths.

6. The method of claim 1, wherein the non-relational database is at least one of a Cassandra database, a BigTable database, a HBase database, and a ScyllaDB database.

7. A system comprising:
   one or more computer readable storage media; and
   instructions stored on the one or more computer readable storage media, wherein the instructions, when executed by one or more computing devices, cause the one or more computing devices to:
   define a plurality of tables in a non-relational database, each table of the plurality of tables storing one or more internet protocol prefixes and indexed based on a first portion of an internet protocol prefix, a second portion of the internet protocol prefix, and a mask length associated with the internet protocol prefix, and wherein query results from the plurality of tables in the non-relational database are returned according to a descending order based on the second portion of the internet protocol prefix and the mask length associated with the internet protocol prefix;
   execute in parallel a query, for a longest prefix match of an internet protocol address, at each table of the plurality of tables, thereby causing a lookup for the longest prefix match of the internet protocol address across the non-relational database, wherein the descending order ensures that a result from the query will correspond to a most specific prefix among the internet protocol prefixes stored in the plurality of tables;
   based on the executing in parallel, obtaining a set of one or more query results from each of at least two of the plurality of tables; and
   identify a specific result from the set of one or more query results, the specific result comprising the most specific longest prefix match of the queried internet protocol address among the set of one or more query results.

8. The system of claim 7, wherein the specific result includes a potential internet protocol prefix match returned from the query executed for at least one of the tables of the plurality of tables.

9. The system of claim 7, wherein the specific result comprises a prefix and a mask, the method further comprising validating the specific result by comparing the internet protocol address to the prefix and mask.

10. The system of claim 9, wherein the specific result is identified and returned, before other results of the set of query results are analyzed, if the prefix is more specific than any other prefix yet to be analyzed.

11. The system of claim 7, wherein the plurality of tables are generated based on a distribution of prefixes across a plurality of mask lengths.

12. The system of claim 7, wherein the non-relational database is at least one of a Cassandra database, a BigTable database, a HBase database, and a ScyllaDB database.

13. A non-transitory computer readable storage medium encoded with instructions, the instructions executable by one or more computing devices, comprising:
    defining a plurality of tables in a non-relational database, each table of the plurality of tables storing one or more internet protocol prefixes and indexed based on a first portion of an internet protocol prefix, a second portion of the internet protocol prefix, and a mask length associated with the internet protocol prefix, and wherein query results from the plurality of tables in the non-relational database are returned according to a descending order based on the second portion of the internet protocol prefix and the mask length associated with the internet protocol prefix;
    executing in parallel, a query, for a longest prefix match of an internet protocol address, at each table of the plurality of tables, thereby causing a lookup for the longest prefix match of the internet protocol address across the non-relational database, wherein the descending order ensures that a result from the query will correspond to a most specific prefix among the internet protocol prefixes stored in the plurality of tables;
    based on the executing in parallel, obtaining a set of one or more query results from each of at least two of the plurality of tables; and
    identifying a specific result from the set of one or more query results, the specific result comprising the most specific longest prefix match of the queried internet protocol address among the set of one or more query results.

14. The non-transitory computer readable medium of claim 13, wherein the specific result includes a potential internet protocol prefix match returned from the query executed for at least one of the tables of the plurality of tables.

15. The non-transitory computer readable medium of claim 13, wherein the specific result comprises a prefix and a mask, the method further comprising validating the specific result by comparing the internet protocol address to the prefix and mask.

16. The non-transitory computer readable medium of claim 15, wherein the specific result is identified and returned, before other results of the set of query results are analyzed, if the prefix is more specific than any other prefix yet to be analyzed.

17. The non-transitory computer readable medium of claim 13, wherein the plurality of tables are generated based on a distribution of prefixes across a plurality of mask lengths.

18. The non-transitory computer readable medium of claim 13, wherein the non-relational database is at least one of a Cassandra database, a BigTable database, a HBase database, and a ScyllaDB database.

* * * * *